Aug. 8, 1944.   E. F. NELSON   2,355,099
MEANS FOR WELDING STUDS
Filed Nov. 12, 1942

INVENTOR
EDWARD F. NELSON
BY Charles J. Evans
HIS ATTORNEY

Patented Aug. 8, 1944

2,355,099

UNITED STATES PATENT OFFICE 2,355,099

MEANS FOR WELDING STUDS

Edward F. Nelson, San Leandro, Calif.

Application November 12, 1942, Serial No. 465,397

6 Claims. (Cl. 219—17)

My invention relates to devices for welding a stud electrically to a plate or other member.

One of the objects of my invention is the provision of an improved stud holding means which lends itself to welding in any position.

Another object is the provision of improved means for shielding the end of the stud during welding and for supporting the shielding means.

My invention possesses other objects and features of advantage, some of which, with the foregoing, will be set forth in the following description of my invention. It is to be understood that I do not limit myself to the showing made by the said description, and the drawing, as I may adopt variant forms of my invention within the scope of the appended claims.

In the drawing which is on an enlarged scale,

Reference is made to my copending application, Serial No. 476,518, in which the stud used with my present invention is described and claimed.

The joining of metal parts by fusing or welding them together has become one of the most if not the most important process in modern construction. Successful application of the welding procedure involves a number of critical factors, the control of which has been reached only as the culmination of long experiment and experience by many able minds.

In various types of steel construction, but especially in ship building, it is necessary to weld enormous numbers of studs to deckplates, beams and other structural members which may lie in any position or angle to the horizontal. Even with a small diameter stud, mere establishment of a fusing arc between it and the plate to which it is to be fixed, does not necessarily result in a good and strong weld, although the position of the stud, timing of the arc, and other matters with which my present invention is not concerned, are efficiently provided for.

The arc will inevitably take the path of least resistance; and in doing this may play all over the end of the stud, finally fixing on and perhaps overheating one spot on the edge while failing to heat sufficiently other portions, so that when the stud is plunged against the plate to merge the melted areas of metal, fusing or coalescing over the whole area of the stud end does not take place and the weld is imperfect.

It is therefore of first importance in the rapid production of sound welds of cylindrical studs to control the arc so that it heats evenly across the end of the stud, and concurrently over the area of the plate upon which the stud is to be set. This is best accomplished by forcing the arc to a central position so that heating extends evenly outwardly to the edge of the end surface. The conservation of the arc-generated heat is also important in this connection, as is also confinement of the flux, molten metal and hot gases to the immediate area of the stud end. Protection from air currents or other disturbing factors also plays a part.

In order to start and keep the arc working in a central position, I provide a peculiar shape and construction at the welding end of the stud; and in order to preserve and protect the areas under treatment, I provide a surrounding sheath or ferrule.

Figure 1:
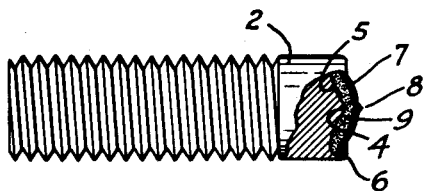
Figure 1 is a side elevation of a stud used with my invention, a portion being shown cut away to disclose the construction of the flux-loaded end.

In greater detail my invention is designed to be used with a stud 2, which is usually threaded as shown, and which may be of any length suitable to the purpose which it is to serve. In the application of my invention which is illustrated herein, the stud 2 is to be welded to a vertical plate 3, Figure 3. The end of the stud which is to be welded is shaped substantially as shown in Figure 1, with a central conical point 4 and a surrounding recess or depression 5 ending at the peripheral flange 6, which is upset or spun inwardly over the edge of a thin metal shell or cap 7 to hold the latter securely in place. The cap is also provided with a centrally disposed point 8, which together with the inner point 4, lies substantially in the long axis of the stud. Prior to fixing the cap in place, the recess between the cap and end of the stud proper is filled with a flux 9 which comes into action to protect and facilitate the coalescing of the metal during the welding process. Any suitable flux may be utilized, but I prefer a mixture of iron and aluminum. A similar flux has long been used loose about the area of the weld, but obviously it could not be applied overhead or on steeply sloping surfaces and even when the surface was flat and facing up, the powder was easily blown away or otherwise disturbed so that defective welds and failures were frequent. My stud loaded with the exact quantity of flux needed for the weld may be used in any position and the flux is protected and preserved up to the moment when its function is performed.

The inner and outer points also play an important part in the formation and control of the welding arc, since the current establishes itself between the surface to which the stud is to be affixed and the nearest point on the stud. The beginning of the current flow is through the outer point 8. With the almost immediate breakdown of the cap and the melting of the flux, the current flow jumps to the inner point 4. While it cannot be said that the welding current continues to pass exclusively through this central section, it is true that the points first direct and then tend to stabilize the main current flow through the central area of the stud end, so that the stud is evenly heated over its entire end; and correspondingly, the adjacent area of the plate 3 is evenly heated to receive the stud.

Figure 2:
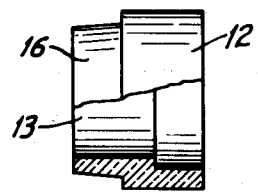
Figure 2 is a side elevation of the arc shielding means or ferrule of my invention, a portion being shown cut away, the better to disclose its shape.

Closely tied up with the heating of the stud and plate is the enclosure which I provide about the end of the stud and the arc while the weld is being made. Preferably this is accomplished by a sleeve or ferrule 12 of porcelain or other refractory material shaped as best indicated in Figure 2. The ferrule slides readily over the stud but the central bore 13 which is slightly larger than the stud with which the ferrule is used is enlarged somewhat so that a small chamber 14 encloses the flux-loaded end of the stud.

An important feature of the ferrule is the neck 16, slightly tapered to receive the close coils 17 at one end of the widely wound spring 18 with which the ferrule is held about the stud. The other end of the spring is also formed with close coils 19 and the pitch of the coils and the diameter of the spring wire are preferably such as to correspond with a shallow thread 21 cut, for a short distance well back from the outer ends, in the jaws 22 of the chuck 23 of the welding machine.

Figure 3:
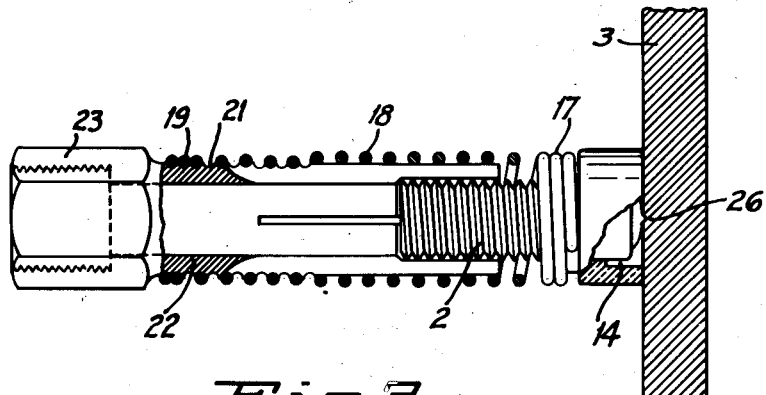
Figure 3 is a side elevation of the whole assembly embodying my invention, in position against a vertical plate to which the stud is to be welded. The plate is shown in vertical section; and portions of the ferrule, holding chuck and spring are shown cut away to disclose structure and relation of parts.

The threaded or unloaded end of the stud is resiliently gripped in the chuck jaws as shown in Figure 3, and the holding spring 18 pushed on to the smooth ends of the jaws to the threads. A ferrule is then mounted in the free end of the spring whose tight coils 17 resiliently grip the tapered neck 16. Spring and ferrule are then turned on the chuck to adjust the ferrule to project some distance beyond the stud end, so that when the stud is pressed against the plate, as indicated in Figure 3, and then withdrawn a short distance to draw the welding arc, the ferrule is resiliently pressed against the plate to completely enclose the flux-loaded end of the stud during the weld cycle.

It will be observed that the position or angle of slant of the plate 3 makes no difference. In whatever position my device is used, there is even heating of the areas to be joined, magnetic blow is eliminated, and the flux and molten metal are closely confined about the fusing parts. Arc flash, so injurious to the eyes, is almost entirely prevented.

Another function of the pointed stud is that of permitting and facilitating the rapid and accurate positioning of the studs. When the stud is being welded through an aperture in a wooden plank, the ferrule may act as a bushing to center the stud in the hole, but on open work, the stud position may be indicated by a punch mark, so that a highly accurate lay-out may be effected. In such cases the welding machine is placed at the beginning so that the point 8 of the stud lies in the punch mark. This insures an accurate placing of the stud when the weld is completed.

At the completion of a weld, the welding machine is moved to a new location, the chuck jaws being pulled free of the resiliently engaged and now welded stud. The spring coils 17 resiliently engaging the tapered neck of the ferrule also pull free, the taper aiding in this disengagement. This leaves the ferrule, or what is left of it, around the base of the stud. The ferrule is largely destroyed by the intense heat of the arc and the melted metal for which it forms a mold when the stud is plunged against the plate to complete the weld. In many cases, such for example, when the stud is set through a hole in a wooden deck, the ferrule remnant is left undisturbed in the bottom of the hole. If the stud is on a side wall and to be used for securing a pipe bracket, any remains of the ferrule clinging to the stud may be broken and knocked off by a light blow.

I claim:

1. A device for holding a stud and protecting the end thereof during welding which comprises a chuck in which the stud seats and having threads thereon, a ferrule slidable on the stud and having a neck on the end adjacent the chuck, and a spring having coils at one end resiliently engaging the ferrule neck and coils at the other end resiliently engaging the chuck threads whereby the ferrule may be resiliently held on the stud about its welding end.

2. A device for holding a stud and protecting the end thereof during welding which comprises a chuck in which the stud seats and having threads thereon, a ferrule slidable on the stud and having a tapered neck on the end adjacent the chuck, and a spring having closely wound coils at one end resiliently engaging the ferrule neck and coils at the other end engaging the chuck threads whereby the ferrule may be resiliently held on the stud about its welding end.

3. In a machine for welding a stud to a plate and including a chuck to hold the stud, a spring mounted on the chuck, a ferrule loosely slidable on the stud to seat against the plate about the welding end of the stud and having a tapered neck on the end nearest the chuck releasably held in the adjacent end coils of said spring.

4. In a machine for welding a stud to a plate and including a chuck to hold the stud and a spring mounted on the chuck, a ferrule loosely slidable on the stud to seat against the plate about the welding end of the stud and having a tapered neck on the end nearest the chuck releasably held in the adjacent end coils of said spring, that part of the opening through the ferrule which surrounds the welding end of the stud being enlarged to provide a mold chamber for the molten material present between stud and plate during the welding process.

5. In a machine for welding a stud to a plate and including a chuck to hold the stud, a spring adjustably mounted on the chuck, a ferrule loosely slidable on the stud to seat against the plate about the welding end of the stud and having a portion on the end nearest the chuck releasably held in the adjacent end coils of said spring.

6. In a machine for welding a stud to a plate and including a chuck to hold the stud, a ferrule closely surrounding the stud and slidable thereon to seat against the plate about the welding end of the stud, and a spring interposed between the chuck and the ferrule to press the ferrule against the plate.

EDWARD F. NELSON.